United States Patent [19]

Taubitz et al.

[11] Patent Number: 4,990,564

[45] Date of Patent: Feb. 5, 1991

[54] THERMOPLASTIC MOLDING MATERIALS

[75] Inventors: Christof Taubitz, Wachenheim; Horst Reimann, Worms; Klaus Boehlke, Hessheim; Hermann Gausepohl, Mutterstadt; Christoph Plachetta, Limburgerhof, all of Fed. Rep. of Germany

[73] Assignee: BASF Aktiengesellschaft, Ludwigshafen, Fed. Rep. of Germany

[21] Appl. No.: 284,552

[22] Filed: Dec. 15, 1988

[30] Foreign Application Priority Data

Dec. 15, 1987 [DE] Fed. Rep. of Germany ....... 3742444

[51] Int. Cl.$^5$ .................... C08L 77/00; C08L 71/04
[52] U.S. Cl. ...................... 525/66; 525/391; 525/392; 525/397
[58] Field of Search ................ 525/66, 391, 392, 397

[56] References Cited

U.S. PATENT DOCUMENTS

| | | | |
|---|---|---|---|
| 3,379,792 | 4/1968 | Finholt | 525/397 |
| 4,315,086 | 2/1982 | Ueno et al. | 525/391 |
| 4,339,376 | 6/1982 | Kasahara et al. | 524/116 |
| 4,659,763 | 4/1987 | Gallucci et al. | 525/397 |
| 4,732,938 | 3/1988 | Grant et al. | 525/92 |
| 4,760,114 | 7/1988 | Haaf et al. | 525/397 |

FOREIGN PATENT DOCUMENTS

| | | |
|---|---|---|
| 24120 | of 0000 | European Pat. Off. . |
| 46040 | of 0000 | European Pat. Off. . |
| 226910 | of 0000 | European Pat. Off. . |
| 147874 | 10/1984 | European Pat. Off. . |
| 244090 | 3/1987 | European Pat. Off. . |
| 8700540 | 1/1987 | World Int. Prop. O. . |

*Primary Examiner*—Ana L. Carrillo
*Attorney, Agent, or Firm*—Oblon, Spivak, McClelland, Maier & Neustadt

[57] ABSTRACT

Thermoplastic molding materials containing, as essential components,
 (A) 5-95% by weight of a partially aromatic copolyamide essentially composed of
  ($A_1$) 20-90% by weight of units derived from terephthalic acid and hexamethylenediamine
  ($A_2$) 0-50% by weight of units derived from $\epsilon$-caprolactam and
  ($A_3$) 0-80% by weight of units derived from adipic acid and hexamethylenediamine,
 (B) 5-95% by weight of a polyphenylene ether,
 (C) 0-45% by weight of a vinylaromatic polymer and
 (D) 0-40% by weight of a rubber impact-modifier, are prepared.

8 Claims, 1 Drawing Sheet

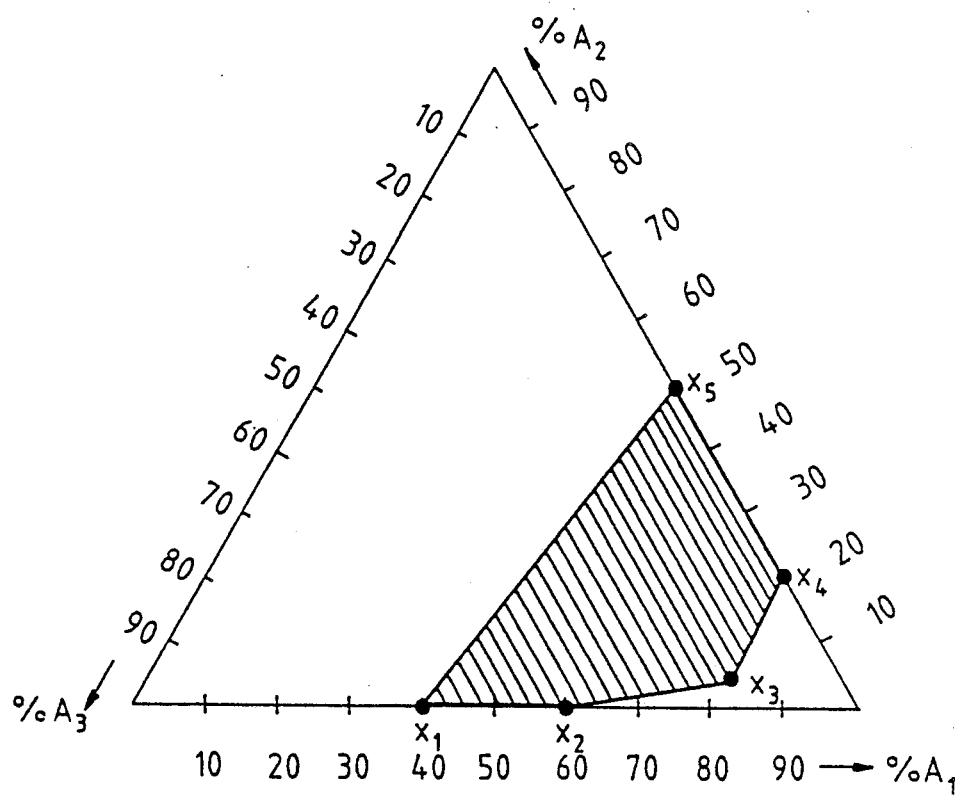

THERMOPLASTIC MOLDING MATERIALS

The present invention relates to novel thermoplastic molding materials containing, as essential components,
(A) 5–95% by weight of a partially aromatic copolyamide, essentially composed of
  ($A_1$) 20–90% by weight of units derived from terephthalic acid and hexamethylenediamine,
  ($A_2$) 0–50% by weight of units derived from ε-caprolactam and
  ($A_3$) 0–80% by weight of units derived from adipic acid and hexamethylenediamine,
(B) 5–95% by weight of a polyphenylene ether,
(C) 0–45% by weight of a vinylaromatic polymer and
(D) 0–40% by weight of a toughened rubber, the percentages (A)–(D) summing to 100%.

The present invention furthermore relates to a process for the preparation of such molding materials and their use for the production of moldings, and the moldings produced therefrom.

Polyphenylene ethers (PPE) are plastics which have very good thermal, mechanical and electrical properties but only very little resistance to solvents. This also applies to a commercial blend of polyphenylene ethers and styrene polymers. The usefulness of such products are therefore limited.

U.S. Pat. No. 3,379,792 discloses that the melt flow properties of polyphenylene ethers are improved by adding up to 25% by weight of a polyamide. This patent also states that other properties of the polyphenylene ether are substantially adversely affected when more than 20% by weight of a polyamide are added.

GB-A 2 054 623 furthermore discloses blends of polyphenylene ethers and polyamides having relatively high polyamide contents; to obtain good properties, however, it is necessary to mix the melt for a relatively long time. However, such high temperatures over prolonged periods readily result in degredation.

EP-A 24 120 and EP-A 46 040 describe blends of polyamides, unmodified polyphenylene ethers and maleic anhydride and/or maleimide. The materials described in these publications and the moldings produced therefrom possess unsatisfactory impact strength, particularly when rubber is used as an additional component, and the melt flow index (MFI) which is much too low for many intended uses.

JP-A 59/66452 discloses blends of polyphenylene ethers and polyamides, which contain a PPE which is modified with carboxylic acids or their derivatives and prepared in the presence of not less than 0.1, preferably 0.3–5, % by weight of free radical initiator.

WO-A 87/0540 (PPE) and EP-A 226 910 disclose molding materials which are based on polyphenylene ethers and polyamides and which contain a modified PPE which is prepared by reacting PPE with compounds which contain a C=C double bond and an acid functional group. Although the products obtainable in this manner have good impact strengths, an improvement in the heat distortion resistance and a reduction in the shrinkage during processing are desirable for some applications.

It is an object of the present invention to provide thermoplastic molding materials which are based on polyphenylene ethers and polyamides and exhibit good heat distortion resistance and little shrinkage during processing.

We have found that this object is achieved, according to the invention, by the thermoplastic molding materials defined at the outset. Preferred materials of this type are described in the subclaims.

The novel thermoplastic molding materials contain, as component (A), 5–95, in particular 10–90, particularly preferably 25–70, % by weight of a partially aromatic copolyamide which is essentially composed of
  ($A_1$) 20–90, preferably 35–85, % by weight of units derived from terephthalic acid and hexamethylenediamine,
  ($A_2$) 0–50, preferably 20–50, % by weight of units derived from ε-caprolactam and
  ($A_3$) 0–80, preferably 5–70, % by weight of units derived
from adipic acid and hexamethylenediamine.

Copolyamides of this type are known in principle and are described in the literature, for example in DE-C 929 151, British Patent 1,114,541, DE-A 16 69 45, DE-A 16 20 997 and DE-A 34 07 492.

Polyamides which have been found to be particularly advantageous are those which have a very low triamine content, preferably less than 0.5, in particular less than 0.3, % by weight. Products of this type are easier to process owing to their reluctance to undergo crosslinking and their relatively low melt viscosity for a given solution viscosity.

Such copolyamides are described in detail below.

These partially aromatic copolyamides contain, as component ($A_1$), 20–90% by weight of units derived from terephthalic acid and hexamethylenediamine. A small amount of the terephthalic acid, preferably not more than 10% by weight, based on the total aromatic dicarboxylic acids used, can be replaced with isophthalic acid or other aromatic dicarboxylic acids, preferably those in which the carboxyl groups are in the para position.

In addition to the units derived from terephthalic acid and hexamethylenediamine, the partially aromatic copolyamides contain units derived from ε-caprolactam and/or units derived from adipic acid and hexamethylenediamine.

The amount of units derived from ε-caprolactam is not more than 50, preferably 20–50, in particular 25–40, % by weight, while the amount of units derived from adipic acid and hexamethylenediamine is up to 80, preferably 20–70, in particular 35–65, % by weight.

The copolyamides (A) can also contain both units of ε-caprolactam and units of adipic acid and hexamethylenediamine; in this case, it is advantageous if the amount of units which are free of aromatic groups is not less than 10, preferably not less than 20, % by weight. The ratio of the units derived from ε-caprolactam to those derived from adipic acid and hexamethylenediamine is not subject to any particular restriction.

Copolyamides whose composition lies within the pentagon defined by the vertic $X_1$ to $X_5$ in the ternary system are preferred, the points $X_1$ to $X_5$ being defined as follows:

| | |
|---|---|
| $X_1$ | (40% by weight of units $A_1$) |
| | (60% by weight of units $A_3$) |
| $X_2$ | (60% by weight of units $A_1$) |
| | (40% by weight of units $A_3$) |
| $X_3$ | (80% by weight of units $A_1$) |
| | (5% by weight of units $A_2$) |
| | (15% by weight of units $A_3$) |
| $X_4$ | (80% by weight of units $A_1$) |

|       | (20% by weight of units $A_2$) |
|-------|-------------------------------|
| $X_5$ | (50% by weight of units $A_1$) |
|       | (50% by weight of units $A_2$) |

In the Figure, the pentagon defined by these points is shown in a ternary system.

Polyamides containing 50–80, in particular 60–75, % by weight of units derived from terephthalic acid and hexamethylenediamine (units $A_1$)) and 20–50, preferably 25–40, % by weight of units derived from ε-caprolactam (units $A_2$)) have proven particularly advantageous for many intended uses.

In addition to the units ($A_1$) to ($A_3$) described above, the partially aromatic copolyamides (A) can also contain minor amounts, preferably not more than 15, in particular not more than 10, % by weight of further polyamide building blocks, as known from other polyamides. These building blocks may be derived from dicarboxylic acids of 4 to 16 carbon atoms and aliphatic or cycloaliphatic diamines of 4 to 16 carbon atoms and from aminocarboxylic acids or corresponding lactams of 7 to 12 carbon atoms. A few suitable monomers of these types which may be mentioned here are suberic acid, azelaic acid, sebacic acid and isophthalic acid, as typical examples of the dicarboxylic acids, 1,4-butanediamine, 1,5-pentanediamine, piperazine, 4,4'-diaminodicyclohexylmethane, 2,2-(4,4'-diaminodicyclohexyl)-propane and 3,3'-dimethyl-4,4'-diaminodicyclohexylmethane, as typical examples of the diamines, and capryllactam, enantholactam, omega-aminoundecanoic acid and laurolactam, as typical examples of lactams or aminocarboxylic acids.

Because of the lower triamine content of the preferred copolyamides, the latter have lower melt viscosities, for identical solution viscosity, compared with products of the same composition which have a higher triamine content (in particular a content of dihexamethylenetriamine). This improves both the processability and the product properties.

The melting points of the partially aromatic copolyamides (A) are from 260° C. to above 300° C., this high melting point also being associated with a high glass transition temperature of, as a rule, more than 75° C., in particular more than 85° C.

Binary copolyamides based on terephthalic acid, hexamethylenediamine and ε-caprolactam and containing about 70% by weight of units derived from terephthalic acid and hexamethylenediamine have melting points in the region of 300° C. and a glass transition temperature of more than 110° C.

Binary copolyamides based on terephthalic acid, adipic acid and hexamethylenediamine (HMD) have melting points of 300° C. or higher, even with relatively low contents of about 55% by weight of units of terephthalic acid and hexamethylenediamine, the glass transition temperature not being quite as high as in the case of binary copolyamides which contain ε-caprolactam instead of adipic acid or adipic acid/HMD.

The copolyamides described above and having a low triamine content can be prepared by the process described in EP-A 129 195 and 129 196.

In this process, an aqueous solution of the monomers, ie. in this case the monomers which form the units ($A_1$) to ($A_3$), is heated to 250°–300° C. under superatmospheric pressure with simultaneous evaporation of water and formation of a prepolymer, after which prepolymers and vapors are separated continuously, the vapors are rectified and the entrained diamines are recycled. Finally, the prepolymer is fed to a polycondensation zone and subjected to polycondensation under 1–10 bar gage pressure and at 250°–300° C. In the process, it is important that the aqueous salt solution is heated under 1–10 bar gage pressure within a residence time of less than 60 seconds, the conversion on emergence from the evaporation zone advantageously being not less than 93% and the water content of the prepolymer being not more than 7% by weight.

These short residence times substantially prevent the formation of triamines.

The aqueous solutions used have, as a rule, a monomer content of 30–70, in particular 40–65, % by weight.

The aqueous salt solution is fed, advantageously at 50°–100° C., continuously into an evaporation zone, in which the aqueous salt solution is heated under 1–10, preferably 2–6, bar gage pressure to 250°–330° C. The temperature employed is of course above the melting point of the particular polyamide to be prepared As mentioned above, in this preferred process it is important that the residence time in the evaporation zone is not more than 60, preferably 10–55, in particular 10–40, seconds.

The conversion on emergence from the evaporation zone is not less than 93%, preferably 95–98%, and the water content is preferably 2–5, in particular 1–3, % by weight.

The evaporation zone is advantageously in the form of a tube bundle. Tube bundles which have proven particularly useful are those in which the individual tubes have a periodically repeating tubular and slot-like cross-section.

It has also proven advantageous if the mixture of prepolymer and vapor is passed through a tubular mass transfer zone provided with baffles prior to phase separation and directly downstream of the evaporation zone while maintaining in the temperatures and pressure conditions employed in the evaporation zone. The baffles, for example packing, such as Raschig rings, metal rings or, in particular, wire mesh packing, provide a large surface area. This brings the phases, i.e. prepolymer and vapor, into intimate contact with one another. The result of this is that the amount of the diamine liberated with steam is considerably reduced. As a rule, a residence time of from 1 to 15 minutes is maintained in the mass transfer zone. This zone is advantageously in the form of a tube bundle.

The two-phase mixture of vapor and prepolymer emerging from the evaporation zone or mass transfer zone is separated. As a rule, separation occurs automatically owing to the physical differences in a vessel, the lower part of the vessel advantageously being in the form of a polymerization zone. The vapors liberated essentially consist of steam and diamines, which were liberated on evaporation of the water. These vapors are passed into a column and rectified. Examples of suitable columns are packed columns, bubble tray columns or sieve tray columns having from 5 to 15 theoretical plates. The column is advantageously operated under identical pressure conditions as the evaporation zone. The diamines contained in the vapors are separated off here and recycled to the evaporation zone. It is also possible to feed the diamines to the downstream polymerization zone. The rectified steam obtained is taken off at the top of the column.

The resulting prepolymer, which, depending on its conversion, essentially consists of a low molecular weight polyamide and may contain residual amounts of unconverted salts and as a rule has a relative viscosity of 1.2–1.7, is fed into a polymerization zone. In the polymerization zone, the melt obtained is subjected to polycondensation at 250°–330° C., in particular 270°–310° C., and 10 under 1–10, in particular 2–6, bar gage pressure. Advantageously, the vapors liberated here are rectified together with the abovementioned vapors in the column; a residence time of 5–30 minutes is preferably maintained in the polycondensation zone. The polyamide thus obtained, which as a rule has a relative viscosity of 1.2–2.3, is removed continuously from the condensation zone.

In a preferred procedure, the resulting polyamide is passed, in molten form, through an extrusion zone with simultaneous removal of the residual water present in the melt. Examples of suitable extrusion zones are devolatilization extruders. The melt freed from water in this manner is then extruded, and the extrudates are granulated. The granules obtained are advantageously condensed to the desired viscosity in the solid phase by means of superheated steam at below the melting point, for example 170°–240° C. The steam obtained at the top of the column is advantageously used for this purpose.

The relative viscosity after the solid-phase postcondensation is in general 2.2–5.0, preferably 2.3–4.5, measured in 1% strength solution in 96% by weight $H_2SO_4$ at 23° C.

In another preferred procedure, the polyamide melt discharged from the polycondensation zone is fed to a further polycondensation zone, where it is condensed to the desired viscosity with continuous formation of new surfaces, at from 285 to 310° C., advantageously under reduced pressure, e.g. 1–500 mbar. Suitable apparatuses are known as finishers.

Another process similar to that described above is disclosed in EP-A 129 196. For details, reference may be made to the publication itself.

The novel molding materials contain, as component B, from 5 to 95, preferably from 20 to 80, in particular from 30 to 65, % by weight of one or more polyphenylene ethers.

These are conventional polyphenylene ethers which can be prepared, for example, by oxidative coupling from phenols which are disubstituted in the o-position. Preferably used polyphenylene ethers are those which are compatible with vinylaromatic polymers, i.e. are completely or substantially soluble in these polymers (cf. A. Noshay, Block Copolymers, pages 8–10, Academic Press, 1977 and O. Olabisi, Polymer-Polymer Miscibility, 1979, pages 117–189).

A few polyphenylene ethers, as mentioned, inter alia, in O. Olabisi, loc. cit., pages 224–230 and 245, may be listed here merely by way of example, e.g. poly(2,6-diethyl-1,4-phenylene) oxide, poly(2-methyl-6-ethyl-1,4-phenylene) oxide, poly(2-methyl-6-propyl-1,4-phenylene) oxide, poly(2,6-dipropyl-1,4-phenylene) oxide and poly(2-ethyl-6-propyl-1,4-phenylene) oxide, preferably poly(2,6-dimethyl-1,4-phenylene) oxide, or copolymers such as those which contain 2,3,6-trimethylphenol, as well as polymer blends. However, poly(2,6-dimethyl-1,4-phenylene) oxide is particularly preferred.

The polyphenylene ethers used generally have a weight average molecular weight of from 10,000 to 80,000, preferably from 15,000 to 60,000.

Preferred components (B) are modified polyphenylene ethers which are prepared from the components ($b_1$) to ($b_5$) described in detail below.

Modification is understood as meaning a change in the polyphenylene ether due to reaction of the components ($b_1$) to ($b_5$).

The components ($b_1$) are conventional polyphenylene ethers as described above.

The amount of component ($b_1$) is 4.95–99.9, preferably 10–99.9, in particular 50–90, % by weight, based on the sum of components ($b_1$) to ($b_5$).

The component ($b_2$), which may be present in the modified polyphenylene ether, is a vinylaromatic polymer which is preferably compatible with the polyphenylene ether used.

The weight average molecular weight of these polymers is in general from 1,500 to 2,000,000, preferably from 70,000 to 1,000,000.

Examples of preferred vinylaromatic polymers which are compatible with polyphenylene ethers are described in the abovementioned monograph by Olabisi, pages 224–230 and 245. Vinylaromatic polymers of styrene, chlorostyrene, α-methylstyrene and p-methylstyrene may be mentioned here merely as examples; comonomers such as (meth)acrylonitrile or (meth)acrylates may also be used in the synthesis in minor amounts (preferably not more than 20, in particular not more than 8, % by weight). A particularly preferred vinylaromatic polymer is polystyrene. It is of course also possible to use mixtures of such polymers.

Processes for the preparation of such vinylaromatic polymers are known per se and are described in the literature, so that no further information is necessary here.

Mass, suspension, emulsion and solution polymerization may be mentioned here merely as examples of suitable polymerization processes.

The amount of the vinylaromatic polymer ($b_2$) in the preferred polyphenylene ethers (B) is from 0 to 90, preferably from 0 to 70, in particular from 0 to 60, % by weight.

When fumaric acid ($b_{31}$) is used as component ($b_3$), it has frequently proven advantageous if the molding materials have a certain minimum content of vinylaromatic polymer ($b_2$), preferably not less than 1.95, in particular not less than 4.95, % by weight, based on component (B).

The preferred modified polyphenylene ethers (B) contain, as essential component ($b_3$), one or more of the compounds ($b_{31}$) to ($b_{35}$).

In principle, it is also possible to use mixtures of different compounds ($b_{31}$) to ($b_{35}$), but in general it is advantageous to use only one of these types of compounds.

Component ($b_{31}$) is an α, β-unsaturated dicarboxylic acid or its anhydride. Examples are maleic acid, fumaric acid, itaconic acid, tetrahydrophthalic acid, citraconic acid, maleic anhydride, itaconic anhydride, citraconic anhydride and tetrahydrophthalic anhydride. Fumaric acid is particularly preferred as ($b_{31}$). The amount of ($b_{31}$) is from 0.05 to 10, preferably from 0.1 to 5, % by weight, based on the sum of components ($b_1$) to ($b_5$).

Components ($b_{32}$) are maleimides of the general formula I

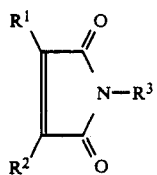  (I)

where $R^1$, $R^2$ and $R^3$ are each hydrogen or an alkyl, alkoxy, cycloalkyl, alkenyl, aryl, arylene or alkylene group of 1 to 12 carbon atoms.

$R^1$, $R^2$ and $R^3$ are preferably each hydrogen or alkyl of 1 to 4 carbon atoms, for example methyl, ethyl, n-butyl, isobutyl or tert-butyl, cycloalkyl of not more than 8 carbon atoms or phenyl which is unsubstituted or substituted by alkyl or alkoxy.

Examples of preferred maleimides are N-methyl maleimide, N-butyl maleimide, N-cyclohexyl maleimide, N-phenyl maleimide N-(p-methylphenyl) maleimide. N-(3,5-dimethylphenyl) maleimide, N-(p-methoxyphenyl) maleimide, N-benzyl maleimide, N-)1-naphthyl) maleimide or mixtures thereof. Among these, N-phenyl maleimide is particularly preferred.

The amount of the maleimide of the general formula I is from 0.05 to 10, preferably from 0.1 to 5, % by weight based on the sum of components ($b_1$) to ($b_5$).

Also suitable as component ($b_3$) are monomers containing amide groups and at least one polymerizable double bond, preferably those of the general formula II or III

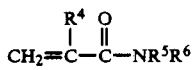  (II)

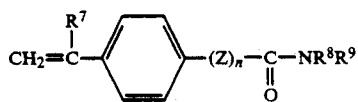  (III)

where $R^4$, $R^5$, $R^6$, $R^7$, $R^8$ and $R^9$ are each hydrogen, an alkyl or alkoxy group of 1 to 12 carbon atoms, cycloalkyl of not more than 12 carbon atoms or aryl, Z is alkylene of 1 to 12 carbon atoms and n is 0 or 1, preferably 0.

Preferred substituents $R^5$, $R^6$, $R^8$ and $R^9$ are each alkyl of 1 to 10 carbon atoms, cycloalkyl of not more than 8 carbon atoms or aryl, preferably phenyl. $R^4$ and $R^7$ are each preferably H or methyl.

Acrylamide, N-methyl-, N-ethyl-, N-propyl-, N-butyl-, N-pentyl-, N-hexyl-, N-heptyl-, N-octyl-, N-nonyl and N-(2-ethylhexyl)-acrylamide, N-cyclohexylacrylamide, N-phenylacrylamide, the corresponding N,N-derivatives, such as N,N-dimethylacrylamide, and the corresponding methacrylamides and their mixtures may be mentioned as examples here.

Acrylamide, methacrylamide, N-phenylacrylamide and N-phenylmethacrylamide are preferably used.

The amount of component ($b_{33}$) is from 0.05 to 10, preferably from 0.1 to 10, in particular from 1 to 5, % by weight, based on the sum of components ($b_1$) to ($b_5$).

A monomer containing lactam groups and one or more polymerizable double bonds ($b_{34}$) can also be used as component ($b_3$).

Lactams of the general structure IV

  (IV)

where X is straight-chain or branched alkylene of 2 to 15 carbon atoms and y is of the general formula

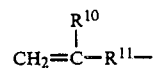

where $R^{10}$ is hydrogen or an alkyl or alkoxy group of 1 to 4 carbon atoms and $R^{11}$ is a divalent substituent

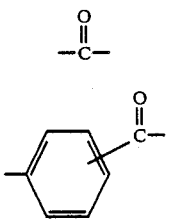

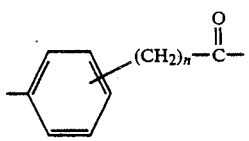

where n is from 1 to 4, are preferably used.

Preferred substituents y very generally are vinyl, acryloyl or methacryloyl skeletons or radicals having styrene skeletons.

Particularly preferred lactam units are those which can be polymerized or copolymerized to give polyamides, as described in Houben-Weyl, Methoden der organ. Chemie, Volume X/2, pages 511–587 (1958) and Volume XIV/2, pages 111–131.

Examples are: β-propiolactams (azetidin-2-ones), such as

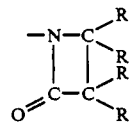

where the radicals R are identical or different alkyl groups of 1 to 6 carbon atoms or hydrogen. Compounds of this type are described in R. Graf, Angew. Chem., 74 (1962), 523–530, and H. Bastian, Angew. Chem., 80 (1968), 3,3'-Dimethyl-3-propiolactam may be mentioned merely as a typical example of this group.

Other preferred lactam units are 2-methylpyrrolidones

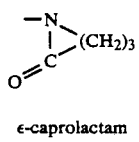

ε-caprolactam

-continued

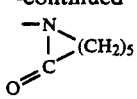

and 7-enantholactam, 8-capryllactam and 12-laurolactam, as described in K. Dachs, Angew. Chem., 74 (1962), 540–545. 2-Pyrrolidones and ε-caprolactams are very particularly preferred.

It is also possible to use mixtures of these compounds.

The lactam units are preferably incorporated in the modified polyphenylene ethers B via a carbonyl group on the nitrogen, as shown in general below.

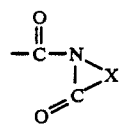

N-(meth)acryloyl-ε-caprolactam

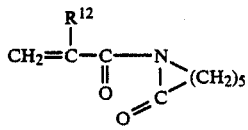

where $R^{12}$ is hydrogen or methyl, is mentioned here merely as a particularly preferred example of a component ($b_{34}$).

The amount of component ($b_{34}$) is from 0.05 to 10, preferably from 0.1 to 10, in particular from 0.5 to 5, % by weight, based on the sum of the components ($b_1$) to ($b_5$).

Components ($b_{35}$) are esters or amides of α,β-unsaturated dicarboxylic acids. Both monoesters and diesters or monoamides and diamides of these acids can be used. Examples of preferred dicarboxylic acids are maleic acid, fumaric acid, chloromaleic acid, dichloromaleic acid, methylmaleic acid, butenyl succinic acid and tetrahydrophthalic acid, of which maleic acid and fumaric acid are particularly preferred.

For the preparation of the esters or amides, these acids or their anhydrides can be reacted with the corresponding alcohols or amines, respectively. Appropriate processes are known per se and are described in the literature, so that further information is unnecessary here.

Primary and secondary monoalcohols, such as methanol, ethanol, n-propanol, isopropanol, n-butanol, isobutanol, pentanols, hexanols, heptanols, octanols, e.g. 2-ethylhexyl alcohol, and higher alcohols, such as dodecanols, and cycloaliphatic alcohols, e.g. cyclohexanol, are preferably used as alcohols for the preparation of the esters. Other suitable alcohols are those having aromatic structural units, e.g. benzyl alcohol. In addition to C, H and O, the alcohols can also contain hetero atoms, such as N, S and Si, in the main chain or as substituents. Finally, alcohols having keto groups in the chain or having halogen substituents may also be mentioned. However, alkanols of 1 to 6 carbon atoms are preferred.

Amines for the preparation of half-amides are, very generally, secondary amines and N-alkylanilines. Examples of these are N-methyl- and N-ethylalkylamines and N-methylaniline. Like the alcohols, the amines can also contain hetero atoms and functional groups.

Very generally, esters, in particular half-esters, are preferred to the amides. The amount of ($b_{35}$) is from 0.05 to 10, preferably from 0.1 to 5, % by weight, based on the total weight of component (B).

Modified polyphenylene ethers which contain component ($b_{35}$) frequently have particularly good flow properties, i.e. particularly high melt flow indices (MFI).

In the preparation of the preferred modified polyphenylene ether B, other comonomers ($b_4$) which react with the components ($b_1$) and, if required, ($b_2$) under the preparation conditions or are grafted on these can, if necessary, also be used. Examples of these are acrylic acid, methacrylic acid, acrylates, methacrylates and vinylaromatic monomers, such as styrene, α-methylstyrene and vinyltoluene, to mention but a few.

The amount of component ($b_4$) is from 0 to 80, preferably from 0 to 45, in particular not more than 20, by weight, based on the sum of components ($b_1$) to ($b_5$). Molding materials which do not contain component ($b_4$) are particularly preferred.

If required, 0–20, preferably 0.01–0.09, particularly preferably 0.02–0.08, in particular 0.03–0.07, % by weight of free radical initiators are used as component ($b_5$) in the preparation of the preferred modified polyphenylene ethers (B).

The amount of component ($b_5$) is, as a rule, smaller than the sum of the amounts of components ($b_3$) and ($b_4$).

The compounds known for this purpose and described in the literature (e.g. J. K. Kochi, Free Radicals, J. Wiley Publishers, New York 1973) can in principle be used as free radical initiators.

In some cases, it has proven advantageous to use free radical initiators whose half life is sufficiently long to ensure that a significant amount of active free radical initiator is present when the PPE has melted.

The result of this is that the components ($b_{31}$) to ($b_{35}$) undergo a relatively well defined reaction with the PPE activated by the free radical initiator and can modify the said PPE.

The point in the PPE molecule at which the free radical initiator attacks is not yet completely clear, but initial discoveries indicate that the activation of the PPE takes place at the methyl substituent ortho to the oxygen atom, and the components ($b_{31}$) to ($b_{35}$) accordingly also attack predominantly in this position.

Examples of free radical initiators are: Di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1,1-di-tert-butylperoxy-3,3,5-trimethylcyclohexane, tert-butyl peroxyisopropylcarbonate, tert-butyl peroxy-3,3,5-trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butylperoxyisopropyl)benzene and di-tert-butyl peroxide.

Organic hydroperoxides, such as diisopropylbenzene monohydroperoxide, cumene hydroperoxide, tert-butyl hydro-peroxide, p-menthyl hydroperoxide and pinane hydroperoxide, and highly branched alkanes of the general structure

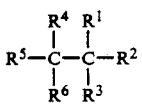

where $R^1$ to $R^6$ independently of one another are each an alkyl or alkoxy group of 1 8 carbon atoms, aryl, such as phenyl or naphthyl, or a 5-membered or 6-membered heterocyclic structure having a $\pi$-electron system and nitrogen, oxygen or sulfur as hetero atoms, are preferred. The substituents $R^1$ to $R^6$ may in turn contain functional groups as substituents, such as carboxyl, carboxyl derivative, hydroxyl, amino, thiol or epoxy groups.

Examples of these are

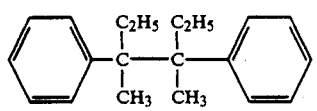

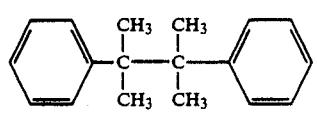

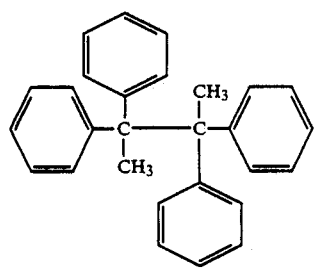

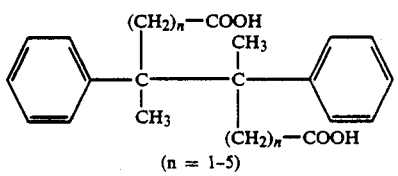

(n = 1-5)

Some of these are commercially available. Cumene hydroperoxide and tert-butyl hydroperoxide are very particularly preferred.

For the preparation of the preferred modified polyphenylene ethers B, the components ($b_1$) to ($b_5$) can be reacted with one another at from 250° to 350° C., preferably from 265° to 295° C. Extruders are particularly suitable for this purpose since they generally also permit thorough mixing of the components. The residence times are in general from 0.5 to 30, preferably from 1 to 3, minutes. Twin-screw extruders are particularly suitable for the novel process.

A particularly preferred variant of the process is described below.

The components ($b_1$) to ($b_5$) are preferably metered in together and melted in a melting zone. The extruder screw in the melting zone preferably contains kneading elements. The melting zone is followed by the reaction zone, which preferably contains kneading elements and additional kneading elements having a downstream backward-conveying thread. A devolatilization zone for removing volatile components is preferably present upstream of the product extrusion zone. The extruded melt is generally granulated, and the granules are used for the preparation of the novel molding materials.

In principle, the modified polyphenylene ether can also be prepared in any reaction vessel which permits reaction of the components with one another.

The novel molding materials may contain, as a further component (C), vinylaromatic polymers if required in an amount of not more than 45, preferably not more than 30, by weight (based on the sum of the components (A) to (D)). Suitable polymers are preferably those which are compatible with polyphenylene ethers, as mentioned as component ($b_2$) in the description of the modified polyphenylene ethers. For further details, reference may therefore be made to the statements on component ($b_2$).

Component (C) may also be toughened. Such polymers are known to the skilled worker as high impact polystyrene (HIPS). The vinylaromatic polymers are prepared in the presence of an impact modifier or are mixed with grafted rubbers. Examples of rubber-like polymers are polybutadiene, styrene/butadiene, styrene-b-butadiene, acrylonitrile/butadiene, ethylene/propylene, polyacrylate and polyisoprene rubbers.

In addition to the grafted rubbers, such as polybutadiene, acrylate, styrene/butadiene, polybutene, hydrogenated styrene/butadiene, acrylonitrile/butadiene, ethylene/propylene and polyisoprene rubbers, which may be present in component (C), these rubbers may also be added in ungrafted form as component (D). Other rubbers (D) are styrene-grafted ethylene/propylene rubbers, thermoplastic ethylene/propylene rubbers, thermoplastic polyester elastomers, ethylene rubbers and ionomers, styrene/butadiene block copolymers, including AB, ABA, ABA tapered, ABAB, ABAB tapered star block copolymers and the like, similar isoprene block copolymers and (partially) hydrogenated block copolymers.

Other suitable components (D) are the rubbers known for toughening polyamides, and acid-modified ethylene polymers, as described in, for example, DE-A 26 22 973. Copolymers of ethylene, acrylates and unsaturated carboxylic acids may be mentioned in particular here. Products of this type are commercially available.

Component (D) may be present in the novel molding materials in amounts of not more than 40, preferably not more than 30, in particular 5–30, % by weight, based on the sum of components (A) to (D).

In addition to the components (A) to (D), the novel thermoplastic molding materials can also contain conventional additives and processing assistants. The amount of these additives is in general not more than 40, in particular not more than 20, % by weight, based on the total weight of components (A) to (D).

Examples of additives are heat stabilizers, light stabilizers, lubricants, mold release agents and colorants, such as dyes and pigments, in conventional amounts. Further additives are reinforcing agents, such as glass fibers, asbestos fibers, carbon fibers and aromatic polyamide fibers, and/or fillers, such as gypsum fibers, synthetic calcium silicates, kaolin, calcined kaolin, wollastonite, talc and chalk, as well as flameproofing agents, such as phosphorus compounds, e.g. phosphates, phosphoric esters, phosphorous esters, phosphinic esters, phosphonous esters, organic phosphine oxides and red phosphorus itself.

It is also possible to add materials for shielding electromagnetic waves, such as metal flakes, metal powders, metal fibers or metal-coated fillers.

Low molecular weight or high molecular weight polymers are also suitable additives.

The novel thermoplastic molding materials are advantageously obtained by mixing the individual components at from 270° to 350° C. in a conventional mixing apparatus, such as a kneader, a Banbury mixer or a single-screw extruder, but preferably in a twin-screw extruder. In order to obtain a very homogeneous molding material, thorough mixing is necessary. The order in which the components are mixed can be varied; for example, two or, if necessary, three components may be premixed or all of the components may be mixed together.

It should be mentioned that, in the preparation of the molding materials, a reaction may sometimes occur between the components (A) to (D), so that the end product may no longer be a pure mixture of these components.

The novel molding materials are distinguished by their balanced properties, in particular by their good heat distortion resistance and their low shrinkage during processing.

They are particularly suitable for the production of moldings by injection molding or extrusion, in particular for parts subjected to high temperatures and components in the automotive sector. In the latter field of use, a particular advantage is that, owing to their good heat distortion resistance, the parts produced from the novel molding materials can be coated on-line, ie. separate time-consuming and expensive coating is not necessary.

EXAMPLES

The following components were used for the preparation of the novel molding materials and comparative products:

Component A

A/1 Copolyamide containing 70% by weight of units derived from terephthalic acid and hexamethylenediamine and 30% by weight of units derived from $\epsilon$-caprolactam. This product was prepared as follows:

An aqueous solution consisting of 35 kg of $\epsilon$-caprolactam, 55 kg of terephthalic acid, 38.5 kg of hexamethylenediamine and 128.5 kg of water was delivered from a heated stock container, at about 80° C., at a rate corresponding to 5 kg of polyamide per hour, by means of a metering pump into a partially horizontal and partially vertical tubular evaporator. The evaporator was heated by means of a liquid heating medium at 295° C., with vigorous circulation. The evaporator had a length of 3 m, a capacity of 180 ml and a heat-transfer surface of about 1300 cm². The residence time in the evaporator was 50 sec. The mixture of prepolymer and steam emerging from the evaporator had a temperature of 290° C. and was separated into steam and melt in a separator. The melt remained in the separator for a further 10 minutes and was then extruded by means of an extruder having a devolatilization zone, and the extrudates were solidified in a water bath and then granulated. The separator and the evaporating zone were kept under 5 bar by a pressure regulating means arranged downstream of the column. The steam separated off in the separator was fed to a packed column which had about 10 theoretical plates and into which about 1 l of vapor condensate per hour was fed at the top to generate reflux. The resulting temperature at the top of the column was 152° C. The steam emerging downstream of the expansion valve was condensed; it contained less than 0.05% by weight of hexamethylenediamine and less than 0.1% by weight of $\epsilon$-caprolactam. An aqueous solution of hexamethylenediamine, which contained 80% by weight of hexamethylenediamine and from 1 to 3% by weight of $\epsilon\epsilon$-caprolactam, based in each case on polyamide produced, was obtained as the bottom product of the column. This solution was recycled to the starting salt solution before the latter entered the evaporator, by means of a pump.

Downstream of the evaporator, the prepolymer had a relative viscosity of 1.25, measured in 98% strength by weight sulfuric acid at 20° C. and was shown to have a conversion of 93–95% by end group analysis. The content of bishexamethylenetriamine was from 0.1 to 0.15% by weight, based on polyamide.

After the polymer melt had emerged from the separator, the polyamide had a very pale natural color and an extremely low bishexamethylenetriamine content of 0.17% and a relative viscosity of from 1.65 to 1.80.

The product contained about 1 equivalent of terminal carboxyl and amino groups.

The content of extractables (extraction with methanol) was from 3.1 to 3.3% by weight.

In the discharge extruder, the melt was then let down to atmospheric pressure and underwent virtually no further condensation during a residence time of less than minute. The granules obtained were condensed to a final viscosity $\eta$-rel of 2.50 by continuous solid-phase condensation with superheated steam at 195° C. during a residence time of 30 hours. The content of extractables was then 0.2% by weight (methanol extract).

The following polyamides were used for comparison.

A/V$_1$ Poly-$\epsilon$-caprolactam having a weight average molecular weight of 38,000.

A/V$_2$ Poly-$\epsilon$-caprolactam having a weight average molecular weight of 35,000.

C. Component B

B/1 90% by weight of poly-(2,6-dimethyl-1,4-phenylene) ether (PPE) having a relative viscosity of 0.55 (measured in 1% strength by weight solution in CHCl$_3$ at 25° C.), 8% by weight of polystyrene (MFI at 200° C. and 0.5 kg load =24 g/10 min) and 2% by weight of dimethyl fumarate were melted in a twin-screw extruder at 290° C. and reacted. The product was then devolatilized in a devolatilization zone at 290° C. by reducing the pressure.

The mean residence time in the extruder was 3.5 minutes. The extruded melt was passed through a water bath and then granulated and dried.

B/2 82% by weight of PPE (as in B/1), 14% by weight of polystyrene (as in B/1) and 4% by weight of monomethyl maleate were reacted as described in B/1.

Component C

Polystyrene having an MFI (melt flow index) of 24 g/10 min at 200° C. and 5.0 kg load (polystyrol 144C from BASF AG).

Component D

Styrene/butadiene/styrene three-block copolymer having a styrene content of 30% by weight (Cariflex ® TR 1102 from Shell AG).

For the preparation of the molding materials, components (A) to (D) were mixed in a twin-screw extruder at 320° C., the mixture was extruded and the extrudates were granulated. To determine the Vicat B temperature (according to DIN 53,460) and the shrinkage during processing (according to ASTM D 1299), the appropriate test specimens were injection-molded.

The composition of the materials and the results of the measurements are shown in the Table.

TABLE (All percentages are by weight)

| Example | Composition (% by weight) | | | | Vicat B (°C.) | Shrinkage during processing (%) |
|---|---|---|---|---|---|---|
| | A | B | C | D | | |
| 1 | 50A/1 | 35B/2 | 5 | 10 | 204 | 0.9 |
| 2 | 45A/1 | 45B/2 | — | 10 | 200 | 0.8 |
| 3 | 50A/1 | 36B/1 | — | 14 | 204 | 0.9 |
| 4V | 50A/V$_1$ | 36B/1 | — | 14 | 170 | 1.3 |
| 5V | 50A/V$_1$ | 36B/1 | — | 14 | 187 | 1.4 |
| 6 | 50A/1 | 43B/2 | — | 7 | 205 | 0.9 |
| 7V | 50A/V$_2$ | 43B/2 | — | 7 | 189 | 1.5 |
| 8 | 45A/1 | 50B/1 | 5 | — | 206 | 0.7 |

V = Comparative Examples

We claim:

1. A thermoplastic molding material containing, as essential components,
    (A) 5–95% by weight of a partially aromatic copolyamide, comprising:
        (A$_1$) 20–90% by weight of units derived from terephthalic acid and hexamethylenediamine
        (A$_2$) 0–50% by weight of units derived from ε-caprolactam and
        (A$_3$) 0–80% by weight of units derived from adipic acid and hexamethylenediamine, with the proviso that the amount of units of component (A$_2$) or (A$_3$) or mixtures thereof is not less than 10% by weight based on the composition of (A) and that the partially aromatic copolyamide (A) has a triamine content of less than 0.5% by weight,
    (B) 5–95% by weight of a polyphenylene ether,
    (C) 0–45% by weight of a vinylaromatic polymer derived from styrene, chlorostyrene, α-methylstyrene, p-methylstyrene or mixtures thereof and
    (D) 0–40% by weight of a toughened rubber.

2. A thermoplastic molding material as claimed in claim 1, wherein the polyphenylene ether (B) is a modified polyphenylene ether prepared from
    (b$_1$) 4.95–99.9% by weight of a polyphenylene ether,
    (b$_2$) 0–90% by weight of a vinylaromatic polymer,
    (b$_3$) 0.05–10% by weight of one or more compounds from the group consisting of
        (b$_{31}$) an α-β-unsaturated dicarboxylic acid or its anhydride,
        (b$_{32}$) a maleimide of the formula I

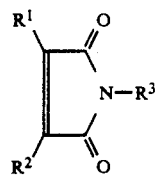

wherein R$^1$, R$^2$ and R$^3$ are each hydrogen or an alkyl, alkoxy, cycloalkyl, alkenyl, aryl, arylene or alkylene group of 1 to 12 carbon atoms, (b$_{33}$) a monomer containing amide groups and a polymerizable double bond,
        (b$_{34}$) a monomer containing lactam groups and a polymerizable double bond and
        (b$_{35}$) an ester of an α,β-unsaturated dicarboxylic acid,
    (b$_4$) 0–80% by weight of acrylic acid, methacrylic acid, acrylates, methacrylates, vinyltoluene or mixtures thereof and
    (b$_5$) 0–20% by weight of a free radical initiator.

3. A thermoplastic molding material as claimed in claim 2, wherein component (b$_{33}$) is a compound of the formula II or III

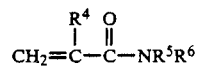 (II)

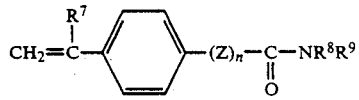 (III)

where R$^4$, R$^5$, R$^6$, R$^7$, R$^8$ and R$^9$ are each hydrogen or an alkyl, alkoxy or cycloalkyl group of 1 to 12 carbon atoms or aryl, Z is alkylene of 1 to 12 carbon atoms and n is 0 or 1.

4. A thermoplastic molding material as claimed in claim 2, wherein component (b$_{34}$) is a compound of the formula IV

 (IV)

where X is straight-chain or branched alkylene of 2 to 15 carbon atoms and Y is of the formula

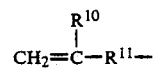

where R$^{10}$ is hydrogen or an alkyl or alkoxy group of 1 to 4 carbon atoms and R$^{11}$ is one of the following divalent radicals

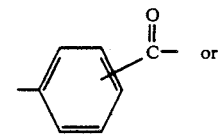 or

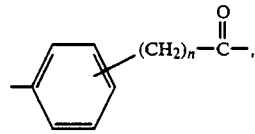

5. A thermoplastic molding material as claimed in claim 2, wherein the free radical initiator (b$_5$) is selected from the group consisting of organic hydroperoxides and highly branched alkanes.

6. A thermoplastic molding material as claimed in claim 1, which contains the following:

(A) 5–95% by weight of a partially aromatic copolyamide, (B) 5–95% by weight of at least one of a modified polyphenylene ether, prepared from ($b_1$) 4.95–99.9% by weight of a polyphenylene ether, ($b_2$) 0–90% by weight of a vinylaromatic polymer, ($b_3$) 0.05–10% by weight of a fumaric acid, ($b_4$) 0–80% by weight of acrylic acid, methacrylic acid, acrylates, methacrylate, vinyltoluene or mixtures thereof and ($b_5$) 0.01–0.09% by weight of free radical initiator, or ($B_1$) an unmodified polyphenylene ether, (C) 0–45% by weight of a vinylaromatic polymer derived from styrene, chlorostyrene, α-methylstyrene, p-methylstyrene or mixtures thereof and (D) 0–40% by weight of a toughened rubber.

7. A molding produced from a molding material as claimed in claim 1.

8. A thermoplastic molding material as claimed in claim 2, wherein said modified polyphenylene ether is prepared by reacting components ($b_1$) to ($b_5$) at a temperature of from 250° to 350° C.

* * * * *